(12) United States Patent
Sugimura et al.

(10) Patent No.: US 10,940,740 B2
(45) Date of Patent: Mar. 9, 2021

(54) HEAT PUMP SYSTEM

(71) Applicant: DENSO CORPORATION, Kariya (JP)

(72) Inventors: Kengo Sugimura, Kariya (JP); Yoshiki Katoh, Kariya (JP); Masayuki Takeuchi, Kariya (JP); Koji Miura, Kariya (JP); Norihiko Enomoto, Kariya (JP); Keigo Satou, Kariya (JP); Ariel Marasigan, Kariya (JP); Nobuyuki Hashimura, Kariya (JP)

(73) Assignee: DENSO CORPORATION, Aichi-pref. (JP)

( * ) Notice: Subject to any disclaimer, the term of this patent is extended or adjusted under 35 U.S.C. 154(b) by 366 days.

(21) Appl. No.: 15/744,598

(22) PCT Filed: Oct. 27, 2016

(86) PCT No.: PCT/JP2016/081821
§ 371 (c)(1),
(2) Date: Jan. 12, 2018

(87) PCT Pub. No.: WO2017/073645
PCT Pub. Date: May 4, 2017

(65) Prior Publication Data
US 2018/0208019 A1      Jul. 26, 2018

(30) Foreign Application Priority Data

Oct. 29, 2015  (JP) .............................. JP2015-213162
Aug. 30, 2016  (JP) .............................. JP2016-168059

(51) Int. Cl.
*B60H 1/08*      (2006.01)
*B60H 1/22*      (2006.01)
(Continued)

(52) U.S. Cl.
CPC ........... *B60H 1/08* (2013.01); *B60H 1/00735* (2013.01); *B60H 1/00899* (2013.01);
(Continued)

(58) Field of Classification Search
CPC ...... B60H 1/321; B60H 1/32284; B60H 1/22; B60H 1/08; F01P 5/00; F01P 2005/105;
(Continued)

(56) References Cited

U.S. PATENT DOCUMENTS

| 10,232,702 B2 * | 3/2019 | Nishikawa ............. B60K 11/02 |
| 2011/0100307 A1 * | 5/2011 | Moffat ...................... F01P 3/12 123/41.1 |

(Continued)

FOREIGN PATENT DOCUMENTS

JP       2014234094 A      12/2014

*Primary Examiner* — Nelson J Nieves
*Assistant Examiner* — Meraj A Shaikh
(74) *Attorney, Agent, or Firm* — Harness, Dickey & Pierce, P.L.C.

(57) ABSTRACT

In a heat pump system, when a heat-shock determination portion determines that a difference between a coolant temperature in a coolant flow path and a coolant temperature in a heat source flow path is equal to or higher than a predetermined temperature, a flow-path switching portion mixes the respective coolants flowing through at least a bypass flow path and the heat source flow path together to flow into the coolant flow path.

10 Claims, 16 Drawing Sheets

(51) Int. Cl.
 *B60H 1/00* (2006.01)
 *F01P 7/16* (2006.01)
 *F01P 3/20* (2006.01)
 *B60H 1/32* (2006.01)

(52) U.S. Cl.
 CPC .......... *B60H 1/00914* (2013.01); *B60H 1/22* (2013.01); *B60H 1/321* (2013.01); *B60H 1/32281* (2019.05); *B60H 1/32284* (2019.05); *F01P 3/20* (2013.01); *F01P 7/16* (2013.01); *B60H 2001/00928* (2013.01); *B60H 2001/3255* (2013.01); *F01P 2025/32* (2013.01); *F01P 2060/08* (2013.01); *F01P 2060/14* (2013.01)

(58) Field of Classification Search
 CPC ............... F01P 2025/34; F01P 2025/36; F01P 2025/50; F01P 2025/52
 See application file for complete search history.

(56) References Cited

U.S. PATENT DOCUMENTS

| | | | |
|---|---|---|---|
| 2011/0197611 A1* | 8/2011 | Hall ................... | B60H 1/00378 62/238.7 |
| 2012/0174602 A1* | 7/2012 | Olivier ................... | B60H 1/004 62/79 |
| 2015/0101789 A1* | 4/2015 | Enomoto ........... | B60H 1/00485 165/202 |
| 2015/0273976 A1* | 10/2015 | Enomoto ................ | B60K 6/22 165/202 |
| 2016/0101666 A1 | 4/2016 | Sugimura et al. | |

* cited by examiner

HEAT PUMP SYSTEM

CROSS REFERENCE TO RELATED APPLICATIONS

This application is a U.S. National Phase Application under 35 U.S.C. 371 of International Application No. PCT/JP2016/081821 filed on Oct. 27, 2016 and published in Japanese as WO 2017/073645 A1 on May 4, 2017. This application is based on and claims the benefit of priority from Japanese Patent Applications No. 2015-213162 filed on Oct. 29, 2015, and No. 2016-168059 filed on Aug. 30, 2016. The entire disclosures of all of the above applications are incorporated herein by reference.

FIELD OF THE INVENTION

The present disclosure relates to a heat pump system that absorbs heat from outside air using a coolant.

BACKGROUND ART

A heat pump system that absorbs heat from the outside air by using a coolant utilizes an outside-air heat absorber (i.e., outside-air heat sink), which is a so-called low temperature (LT) radiator. A heat pump system described in Patent Document 1 below is designed to suppress a decrease in the temperature of the heat medium when frost formation progresses in an outside-air heat sink. Specifically, if the temperature of a heat medium flowing through a first heat-medium circuit is lower than a first predetermined temperature, a heat medium heated by a condenser is caused to flow into the first heat-medium circuit, so that the temperature of the heat medium flowing through the first heat-medium circuit is increased.

RELATED ART DOCUMENT

Patent Document

[Patent Document 1] Japanese Unexamined Patent Application Publication No. 2014-234094

SUMMARY OF INVENTION

During operation of the heat pump system, frost is occasionally attached to the outside-air heat sink. In particular, Patent Document 1 does not describe any defrosting process for removing frost. As mentioned above, in the technique described in Patent Document 1, the temperature of a heat medium flowing through the first heat-medium circuit is increased. Because of this, it is considered that by increasing the temperature of the heat medium to some degree, frost attached to the outside-air heat sink can be removed. However, since the outside-air heat sink with frost attached is in a low-temperature state, any inconvenience might occur in the outside-air heat sink due to heat shock if no special consideration is given.

Accordingly, it is an object of the present disclosure to provide a heat pump system capable of removing frost from an outside-air heat sink, while avoiding the occurrence of inconvenience due to heat shock.

A heat pump system for absorbing heat from outside air using a coolant includes: a flow path unit provided to cause the coolant to pass through an outside-air heat sink, a first switching valve, a heat source, and a second switching valve; a flow-path switching portion that controls a flow-path switching in the flow path by opening and closing the first switching valve and the second switching valve; and a heat-shock determination portion that executes a heat-shock determination to determine whether or not an inconvenience due to heat shock occurs in the outside-air heat sink based on a coolant temperature of the coolant flowing through the flow path. The flow path unit includes a coolant flow path that leads from the first switching valve to the second switching valve through the outside-air heat sink, a heat source flow path that leads from the second switching valve to the first switching valve through the heat source, and a bypass flow path that directly connects the first switching valve to the second switching valve. The flow-path switching portion mixes the coolants flowing through at least the bypass flow path and the heat source flow path and causes a mixed coolant to flow into the coolant flow path, when the heat-shock determination portion determines that a difference between a coolant temperature in the coolant flow path and a coolant temperature in the heat source flow path is equal to or higher than a predetermined temperature.

If a difference from the coolant temperature in the heat source flow path is equal to or higher than a predetermined temperature, inconvenience due to the heat shock can occur. Meanwhile, in the present disclosure, the high-temperature coolant flowing through the heat source flow path is mixed with the intermediate-temperature coolant flowing through the bypass flow path to be supplied into the coolant flow path. Consequently, the coolant at a temperature that prevents the occurrence of heat shock can be supplied.

Accordingly, the present disclosure can provide a heat pump system capable of removing frost from an outside-air heat sink, while avoiding the occurrence of failure due to heat shock.

DESCRIPTION OF EMBODIMENTS

Figure 1:
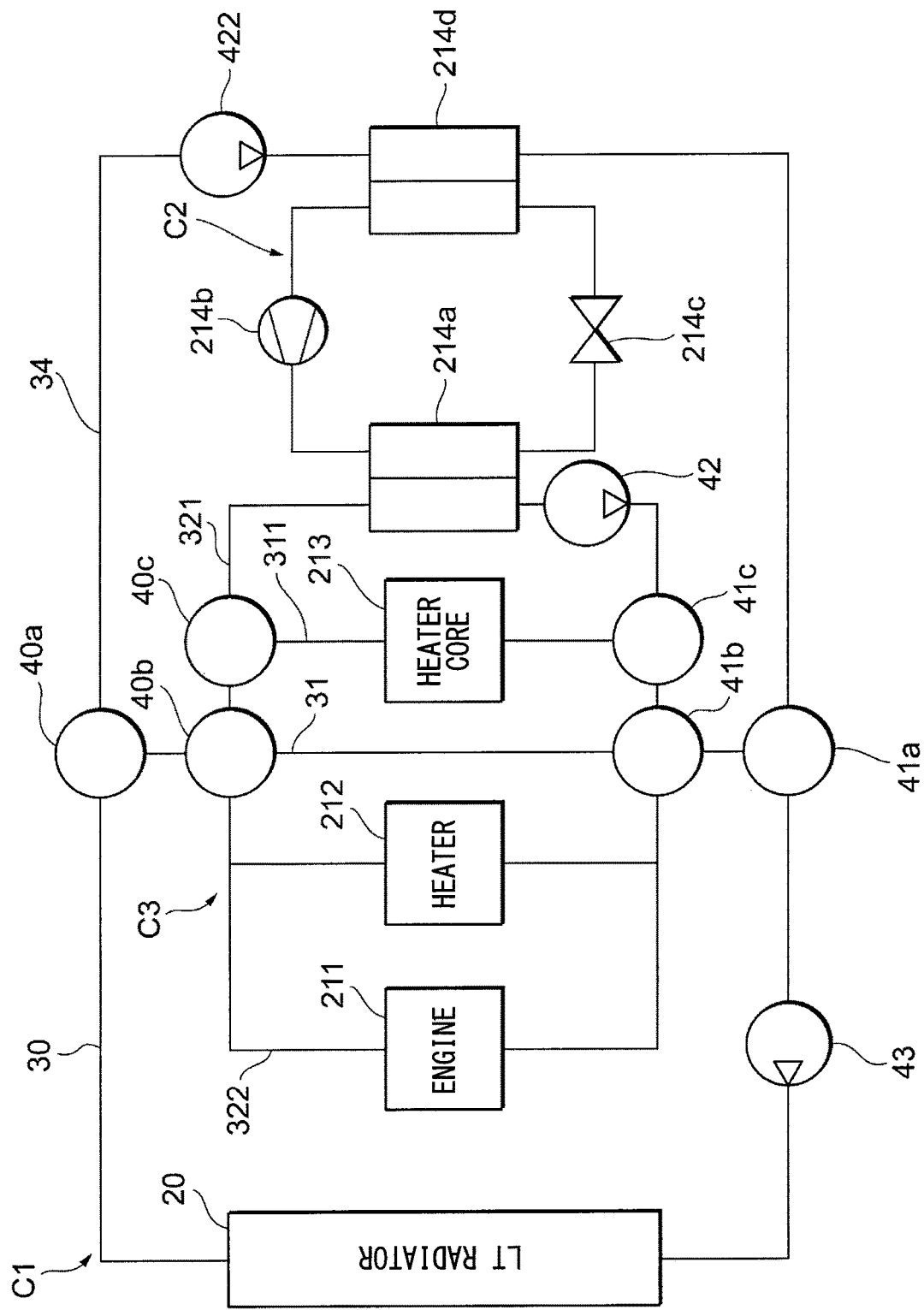
FIG. 1 is a diagram showing an entire configuration of a heat pump system according to an embodiment of the present invention.

Present embodiments will be described below with reference to the accompanying drawings. For easy understanding of the description, the same components in respective figures are denoted with the same reference characters as much as possible, and thus a redundant description thereof will be omitted below.

As shown in FIG. 1, the heat pump system according to an embodiment of the present invention includes a first coolant circuit C1, a refrigeration cycle C2, and a second coolant circuit C3. The first coolant circuit C1 includes an LT radiator 20 as an outside-air heat sink, a three-way valve 41a as a first switching valve, a three-way valve 40a as a second switching valve, a chiller 214d, and water pumps 43 and 422.

The chiller 214d is shared between the first coolant circuit C1 and the refrigeration cycle C2. The LT radiator 20, the three-way valve 40a, the water pump 422, the chiller 214d, the three-way valve 41a, and the water pump 43 are connected together by a heat-absorption side coolant flow path 30 and a heat-exhaust side coolant flow path 34.

The coolant flow path 30 is a flow path that leads from the three-way valve 41a as the first switching valve to the three-way valve 40a as the second switching valve through the LT radiator 20 as the outside-air heat sink. The coolant flow path 34 is a flow path that leads from the three-way valve 40a as the second switching valve to the three-way valve 41a as the first switching valve through the chiller 214d.

The refrigeration cycle C2 includes a water-cooled condenser 214a, a pressure reducing valve 214c, the chiller 214d, and a compressor 214b. The water-cooled condenser 214a, the pressure reducing valve 214c, the chiller 214d, and the compressor 214b are connected together by refrigerant flow paths. The refrigerant at a high pressure and a high temperature in the compressor 214b flows to the water-cooled condenser 214a. The refrigerant heat-exchanged in the water-cooled condenser 214a flows to the pressure reducing valve 214c. The refrigerant decompressed by the pressure reducing valve 214c flows to the chiller 214d. In the chiller 214d, the refrigerant flowing through the refrigeration cycle C2 exchanges heat with the coolant flowing through the first coolant circuit C1.

The refrigerant passing through the chiller 214d evaporates and flows to the compressor 214b. The coolant passing through the chiller 214d is cooled and flows to the LT radiator 20. The coolant flowing to the LT radiator 20 absorbs heat from the outside air and is refluxed to the chiller 214d. When the coolant is cooled in the chiller 214d, the coolant temperature becomes equal to or lower than the outside air temperature. Consequently, the coolant temperature occasionally becomes 0° C. or lower, depending on the outside air temperature. When the coolant temperature is equal to or lower than 0° C., moisture in the air is solidified at the surface of the LT radiator 20, so that frost is formed at the surface of the LT radiator 20, which is a heat exchanger.

The second coolant circuit C3 is a circuit that is provided with an engine 211 as a heat source, a heater 212 as a heat source, a heater core 213 as a heat radiator, and the water-cooled condenser 214a as a heat source and causes the coolant to circulate through these components. Further, the second coolant circuit C3 has heat source flow paths 321 and 322, bypass flow paths 31 and 311, a multi-way valve 41b and a three-way valve 41c as a first switching valve, and a multi-way valve 40b and a three-way valve 40c as a second switching valve.

The multi-way valve 40b is connected to the three-way valve 40a. The multi-way valve 41b is connected to the three-way valve 41a. Switching between the multi-way valves 40a and 40b and the multi-way valves 41a and 41b can cause the coolant to circulate only within the second coolant circuit C3 or can cause the coolant to circulate between the first coolant circuit C1 and the second coolant circuit C3.

The multi-way valve 40b and the multi-way valve 41b are connected together by the heat source flow paths 321 and 322 and the bypass flow paths 31 and 311. Thus, by switching the multi-way valve 40b and the multi-way valve 41b, the coolant flowing through the heat source flow paths 321 and 322 and the bypass flow paths 31 and 311 can be controlled.

The heat source flow path 321 is a flow path that passes through the water-cooled condenser 214a. The coolant passing through the heat source flow path 321 has its temperature increased by the water-cooled condenser 214a. The bypass flow path 311 is a flow path that passes through the heater core 213. The coolant passing through the bypass flow path 311 dissipates its heat at the heater core 213. The three-way valve 40c is provided as the second switching valve at one of branch portions between the heat source flow path 321 and the bypass flow path 311. The three-way valve 41c is provided as the first switching valve at the other branch portion between the heat source flow path 321 and the bypass flow path 311. The three-way valve 41c and the three-way valve 40c are switched to the circulation side, so that the coolant circulates between the water-cooled condenser 214a and the heater core 213, thereby enabling the interior air heating.

The heat source flow path 322 is a flow path that passes through the engine 211 and the heater 212. A bypass flow path 31 is a flow path that directly connects between the multi-way valve 40b and the multi-way valve 41b. No heat source is provided at the midway point in the bypass flow path.

For easy explanation, the present embodiment will be described referring to the heat pump system 1 shown in FIG. 2. The three-way valve 40a, the multi-way valve 40b, and the three-way valve 40c, as shown in FIG. 1, functionally correspond to the three-way valve 40. The switching of the flow path of the three-way valve 40 can be executed by a combination of switching of the flow paths of the three-way valve 40a, the multi-way valve 40b, and the three-way valve 40c. The three-way valve 41a, the multi-way valve 41b, and the three-way valve 41c, as shown in FIG. 1, functionally correspond to the three-way valve 41. The switching of the flow path of the three-way valve 41 can be executed by a combination of switching of the flow paths of the three-way valve 41a, the multi-way valve 41b, and the three-way valve 41c.

The engine 211, the heater 212, and the water-cooled condenser 214a, as shown in FIG. 1, functionally correspond to the heat source 21. The heat source flow path 321 and the heat source flow path 322 correspond to a heat source flow path 32. The flow path unit 3 in the heat pump system 1 includes the coolant flow path 30, the heat source flow path 32, and the bypass flow path 31.

Figure 2:
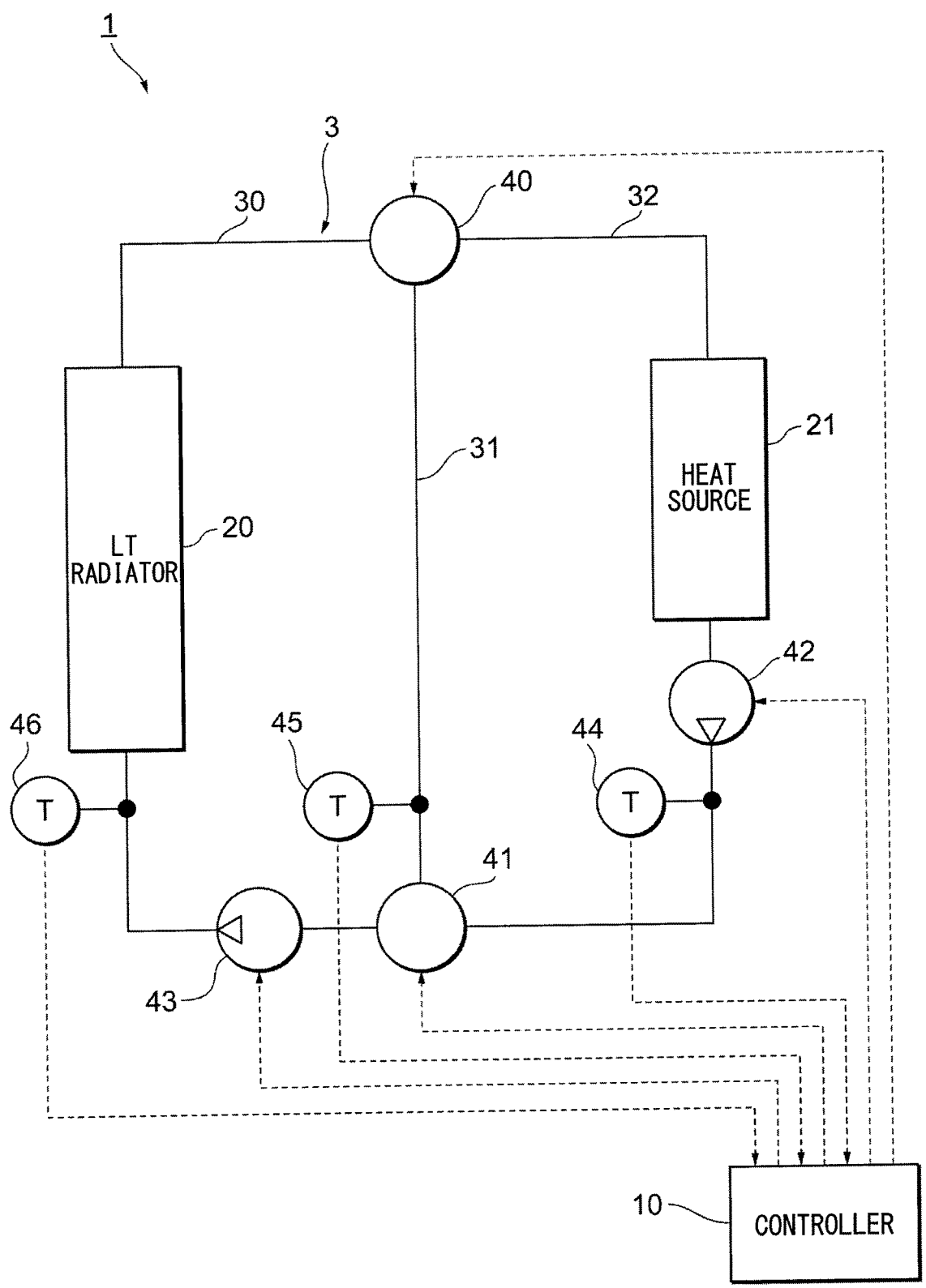
FIG. 2 is a diagram showing a configuration of the heat pump system according to the embodiment of the present invention.

As shown in FIG. 2, the heat pump system 1 according to the present embodiment includes a controller 10, the LT radiator 20 as the outside-air heat sink, and a heat source 21. The LT radiator 20 is disposed in the coolant flow path 30. The coolant flowing through the coolant flow path 30 is in a low-temperature state having a temperature of an outside air temperature or lower.

The heat source 21 is disposed in the heat source flow path 32. The heat source 21 includes the engine and the water-cooled condenser. The coolant flowing through the heat source flow path 32 is in a high-temperature state having a temperature of 40° C. to 80° C.

The coolant flow path 30 and the heat source flow path 32 are connected together by the three-way valves 40 and 41 as switching means. The bypass flow path 31 is provided to connect the three-way valve 40 to the three-way valve 41. Vehicle-mounted devices, such as a cooler core and an inverter (INV), may be included in the bypass flow path 31. The temperature of the coolant flowing through the bypass flow path 31 is higher than the temperature of the coolant flowing through the coolant flow path 30 and lower than the temperature of the coolant flowing through the heat source flow path 32.

The coolant flow path 30 is provided with the water pump 43 and a water-temperature sensor 46. The water pump 43 and the water-temperature sensor 46 are provided between the three-way valve 41 and the LT radiator 20.

The bypass flow path 31 is provided with a water-temperature sensor 45. The heat source flow path 32 is provided with a water pump 42 and a water-temperature sensor 44.

Figure 3:
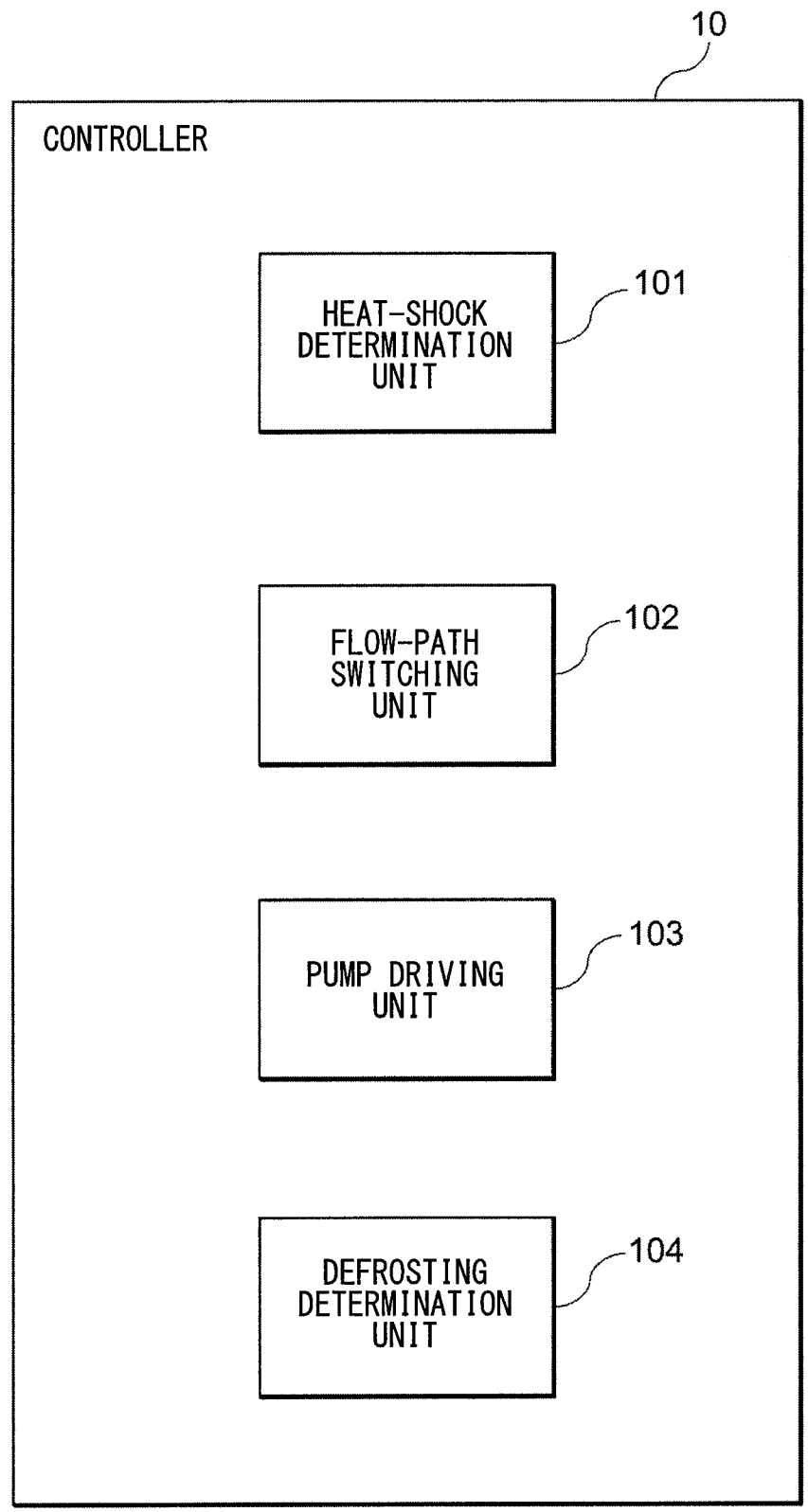
FIG. 3 is a block diagram showing a functional configuration of a controller used in the heat pump system according to the embodiment of the present invention.

The controller 10 receives temperature data output from the water-temperature sensors 44, 45, and 46 and then outputs driving signals to the three-way valves 40 and 41 and the water pumps 42 and 43. As shown in FIG. 3, the controller 10 includes, as functional components, a heat-shock determination portion 101, a flow-path switching portion 102, a pump driving portion 103, and a defrosting determination portion 104.

The heat-shock determination portion 101 is a part that executes heat-shock determination to determine whether or not inconvenience due to heat shock will occur in the LT radiator 20 based on the coolant temperatures at the coolant flow path 30, the heat source flow path 32, and the bypass flow path 31. The heat-shock determination portion 101 recognizes the coolant temperatures at the coolant flow path 30, the heat source flow path 32, and the bypass flow path 31 based on the temperature data output from the water-temperature sensors 44, 45, and 46.

The flow-path switching portion 102 is a part that controls switching of the flow paths in the coolant flow path 30, the heat source flow path 32, and the bypass flow path 31. The flow-path switching portion 102 executes flow-path switching by outputting the driving signals to the three-way valves 40 and 41.

The pump driving portion 103 is a part that drives the water pumps 42 and 43 by outputting driving signals to the water pumps 42 and 43. The defrosting determination portion 104 is a part that determines whether or not the defrosting of the LT radiator 20 is completed.

Figure 4:
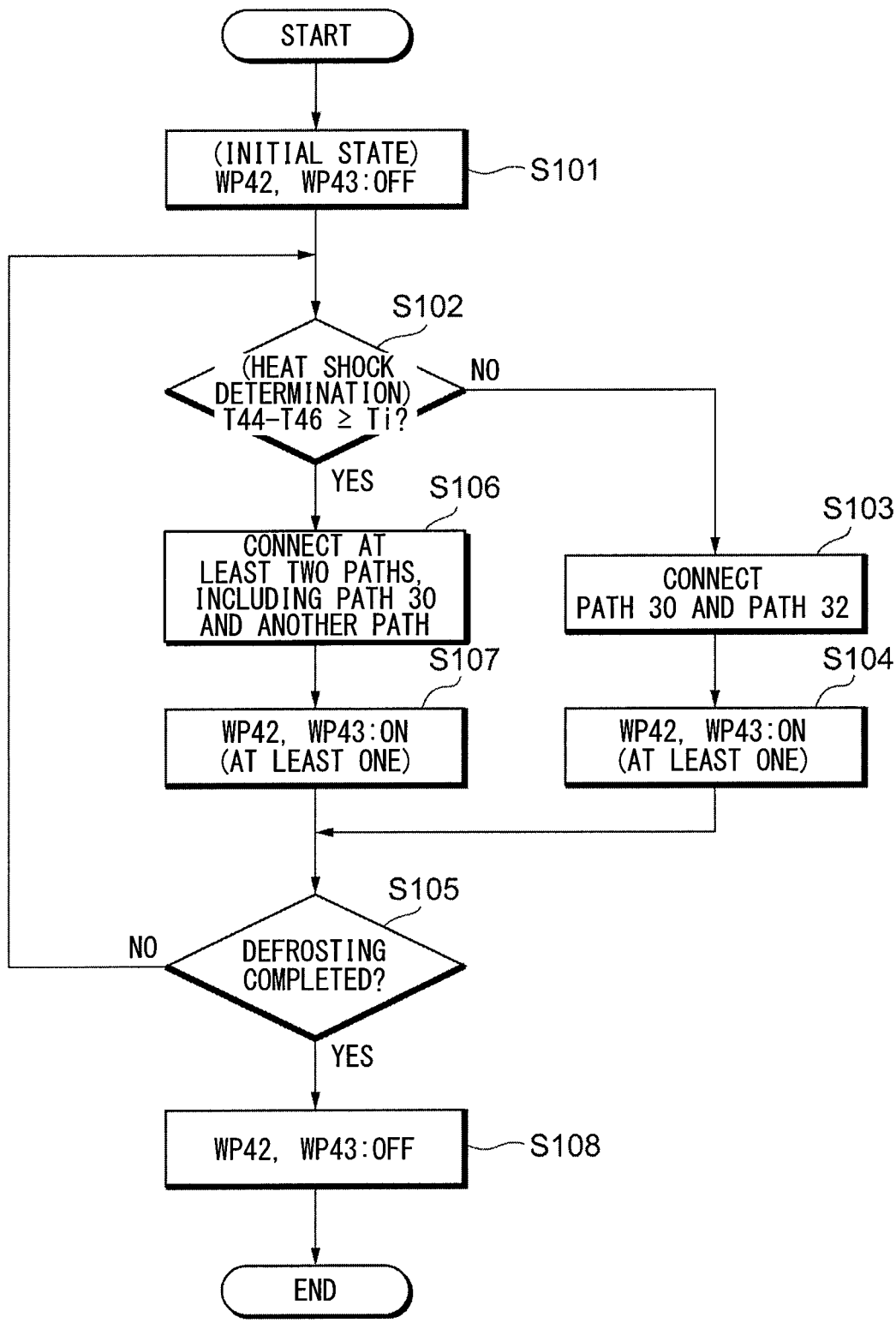
FIG. 4 is a flowchart for explaining an operation of the heat pump system according to the embodiment of the present invention.

Subsequently, referring to FIG. 4, the operation of the controller 10 will be described. In step S101, a stop signal is output from the pump driving portion 103 to each of the water pumps 42 and 43, which become in a stopped state as an initial state.

In step S102 following step S101, the heat-shock determination portion 101 executes heat-shock determination. The heat-shock determination portion 101 determines whether or not a difference between a temperature T44 output from the water-temperature sensor 44 and a temperature T46 output from the water-temperature sensor 46 is equal to or more than a threshold value Ti. If a value obtained by subtracting the temperature T46 from the temperature T44, i.e., a value of temperature T44−temperature T46, is less than the threshold value Ti, heat shock could be determined not to occur, and the operation proceeds to processing in step S103. If a value of temperature T44−temperature T46 is equal to or more than the threshold value Ti, heat shock can be determined to occur, and the operation proceeds to processing in step S106.

Figure 5:
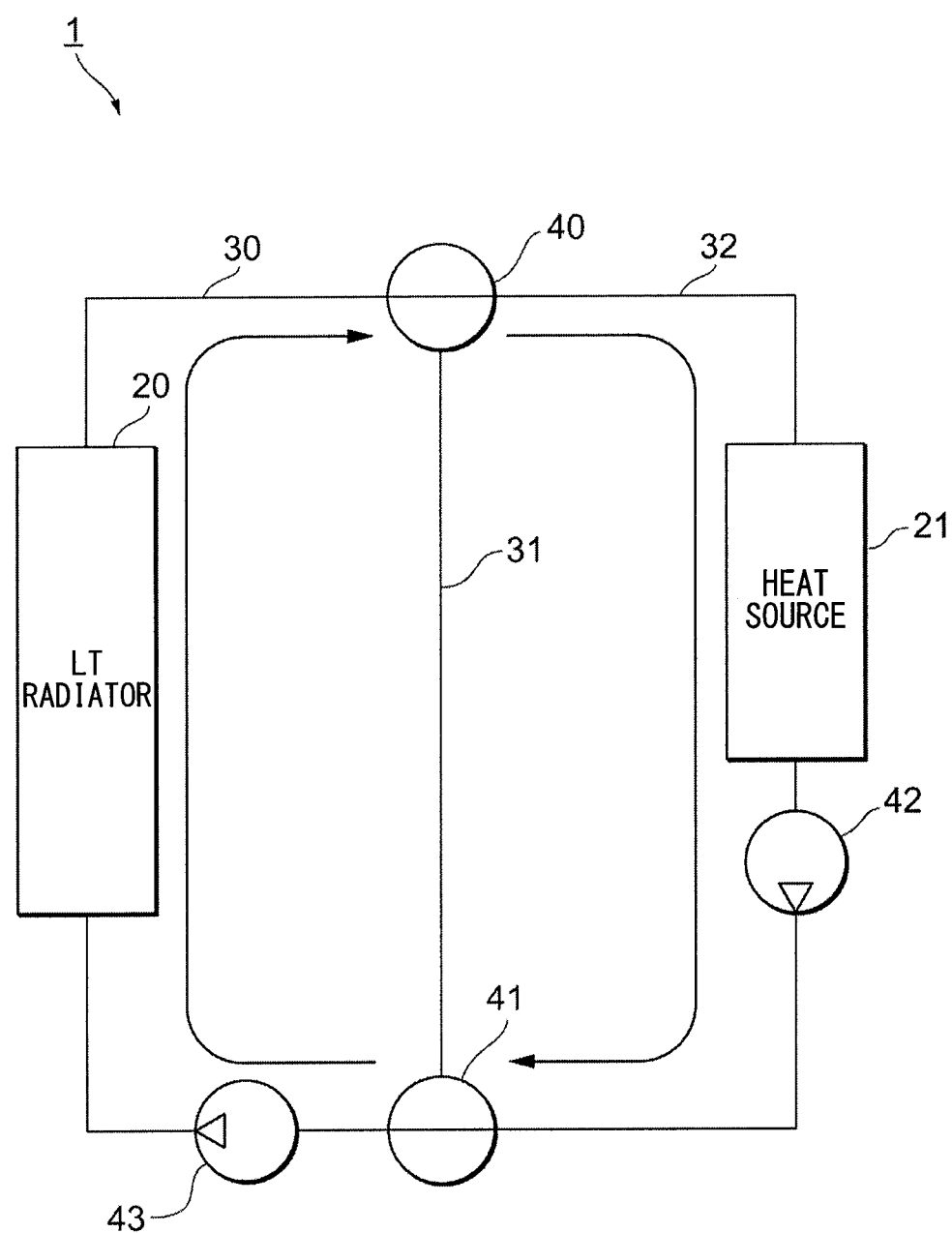
FIG. 5 is a diagram for explaining a flow of coolant in the heat pump system according to the embodiment of the present invention.

In step S103, the flow-path switching portion 102 connects the coolant flow path 30 to the heat source flow path 32. In step S104 following step S103, the pump driving portion 103 drives at least one of the water pump 42 and the water pump 43. As shown in FIG. 5, the coolant circulates through the coolant flow path 30 and the heat source flow path 32, thereby defrosting the LT radiator 20.

In step S106, the flow-path switching portion 102 connects the coolant flow path 30 to at least two other flow paths. In the present embodiment, the flow paths, other than the coolant flow path 30, are two paths, namely, the heat source flow path 32 and the bypass flow path 31. Because of this, the heat source flow path 32 and the bypass flow path 31 are connected to the coolant flow path 30.

Figure 6:
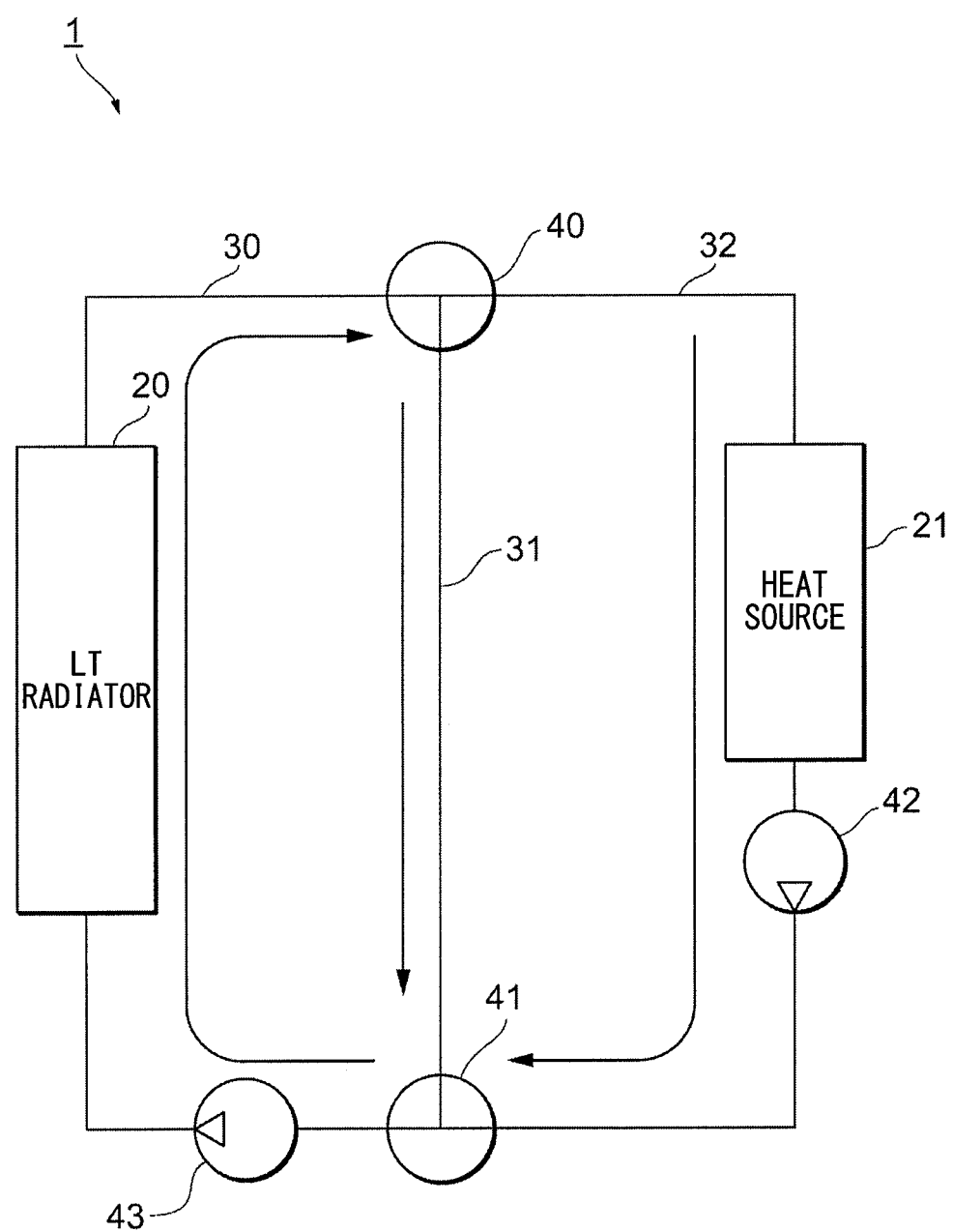
FIG. 6 is a diagram for explaining another flow of coolant in the heat pump system according to the embodiment of the present invention.

In step S107 following step S106, the pump driving portion 103 drives at least one of the water pump 42 and the water pump 43. As shown in FIG. 6, the high-temperature coolant in the heat source flow path 32 and the intermediate-temperature coolant in the bypass flow path 31 are mixed to be supplied to the coolant flow path 30, thereby defrosting the LT radiator 20.

In step S105 following steps S104 and S107, the defrosting determination portion 104 determines whether or not the defrosting of the LT radiator 20 is completed. When the defrosting of the LT radiator 20 is determined not to be completed, the operation returns to the processing in step S102. When the defrosting of LT radiator 20 is determined to be completed, the operation proceeds to processing in step S108.

In step S108, the pump driving portion 103 stops driving the water pump 42 and the water pump 43.

Figure 7:
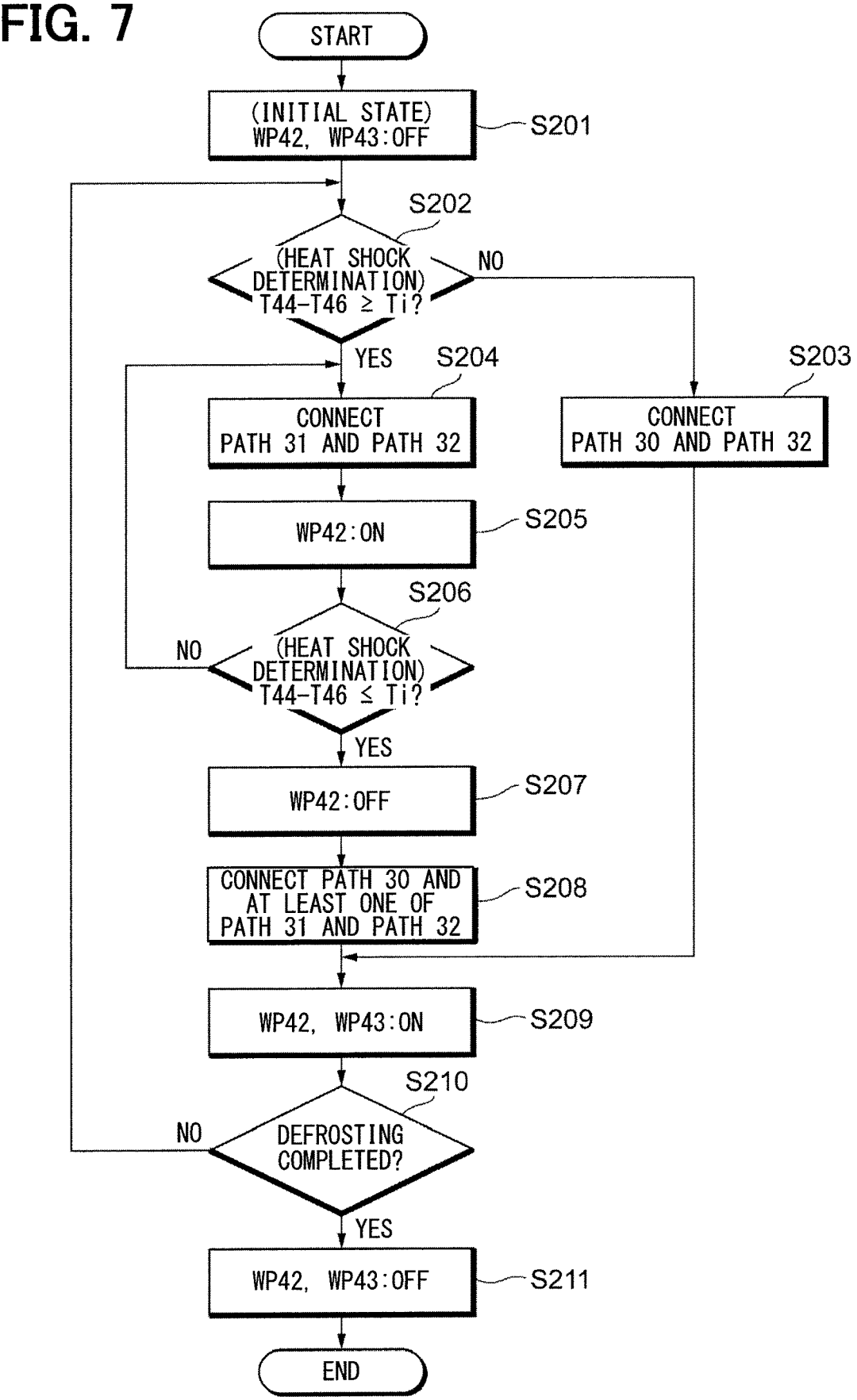
FIG. 7 is a flowchart for explaining another operation of the heat pump system according to the embodiment of the present invention.

Subsequently, referring to FIG. 7, another example of the operation of the controller 10 will be described with reference to FIG. 7. In step S201, a stop signal is output from the pump driving portion 103 to each of the water pumps 42 and 43, which become in a stopped state as an initial state.

In step S202 following step S201, the heat-shock determination portion 101 executes heat-shock determination. The heat-shock determination portion 101 determines whether or not a difference between the temperature T44 output from the water-temperature sensor 44 and the temperature T46 output from the water-temperature sensor 46 is equal to or more than a threshold value Ti. If a value obtained by subtracting the temperature T46 from the temperature T44, i.e., a value of temperature T44−temperature T46, is less than the threshold value Ti, heat shock could be determined not to occur, and the operation proceeds to processing in step S203. If a value of temperature T44−temperature T46 is equal to or more than the threshold value Ti, heat shock can be determined to occur, and the operation proceeds to processing in step S204. In step S203, the flow-path switching portion 102 connects the coolant flow path 30 to the heat source flow path 32.

Figure 8:
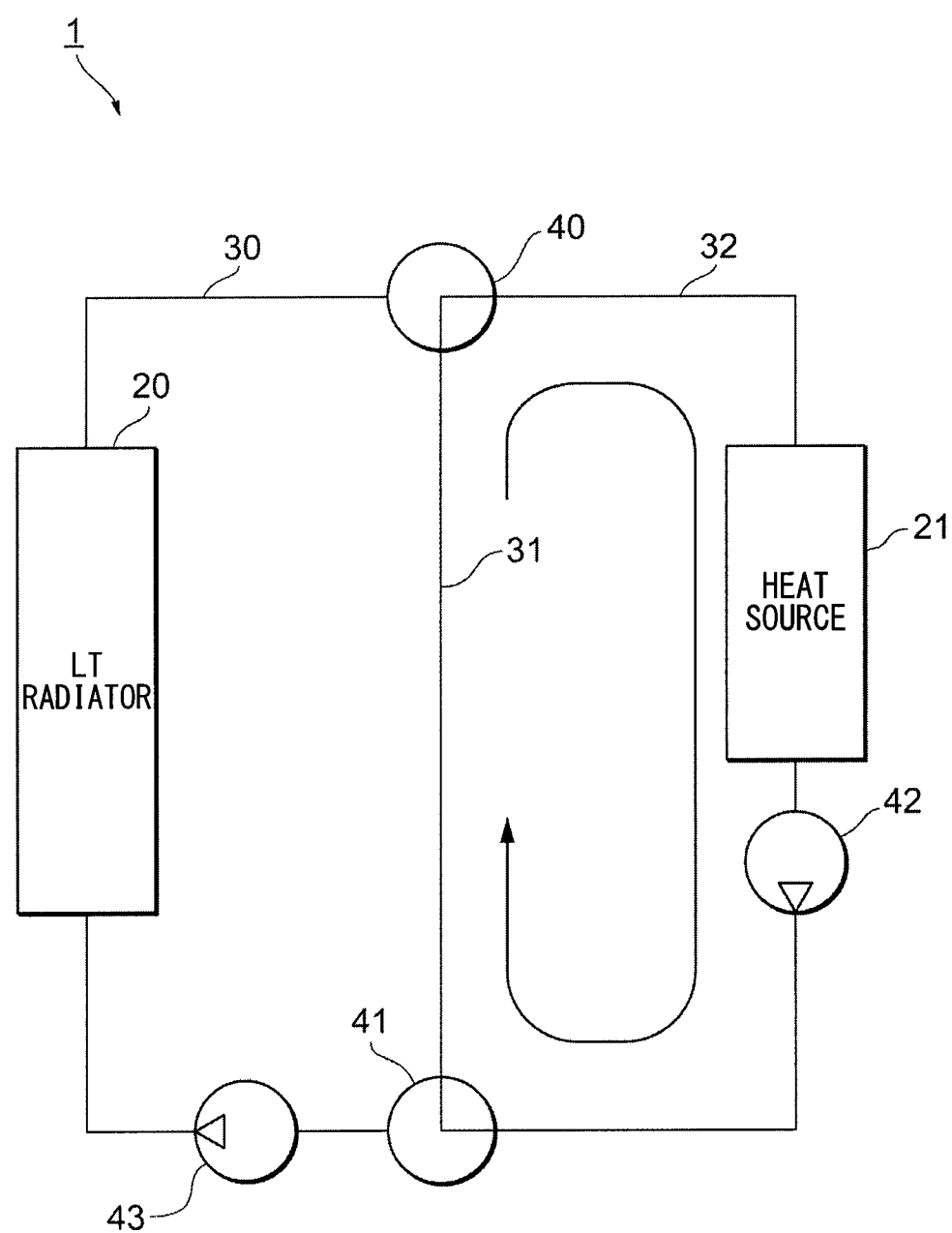
FIG. 8 is a diagram for explaining another flow of coolant in the heat pump system according to the embodiment of the present invention.

In step S204, the flow-path switching portion 102 connects the bypass flow path 31 to the heat source flow path 32. In step S205 following step S204, the pump driving portion 103 drives the water pump 42. As shown in FIG. 8, the high-temperature coolant in the heat source flow path 32 is mixed with the intermediate-temperature coolant in the bypass flow path 31.

In step S206 following step S205, the heat-shock determination portion 101 executes the heat-shock determination. The heat-shock determination portion 101 determines whether or not a difference between a temperature T44 output from the water-temperature sensor 44 and a temperature T46 output from the water-temperature sensor 46 is equal to or more than a threshold value Ti. If a value of temperature T44−temperature T46 is equal to or less than the threshold value Ti, heat shock could be determined not to occur, and the operation proceeds to processing in step S207. If a value of temperature T44−temperature T46 is more than the threshold value Ti, heat shock can be determined to occur, and then the operation returns to processing in step S204.

Figure 9:
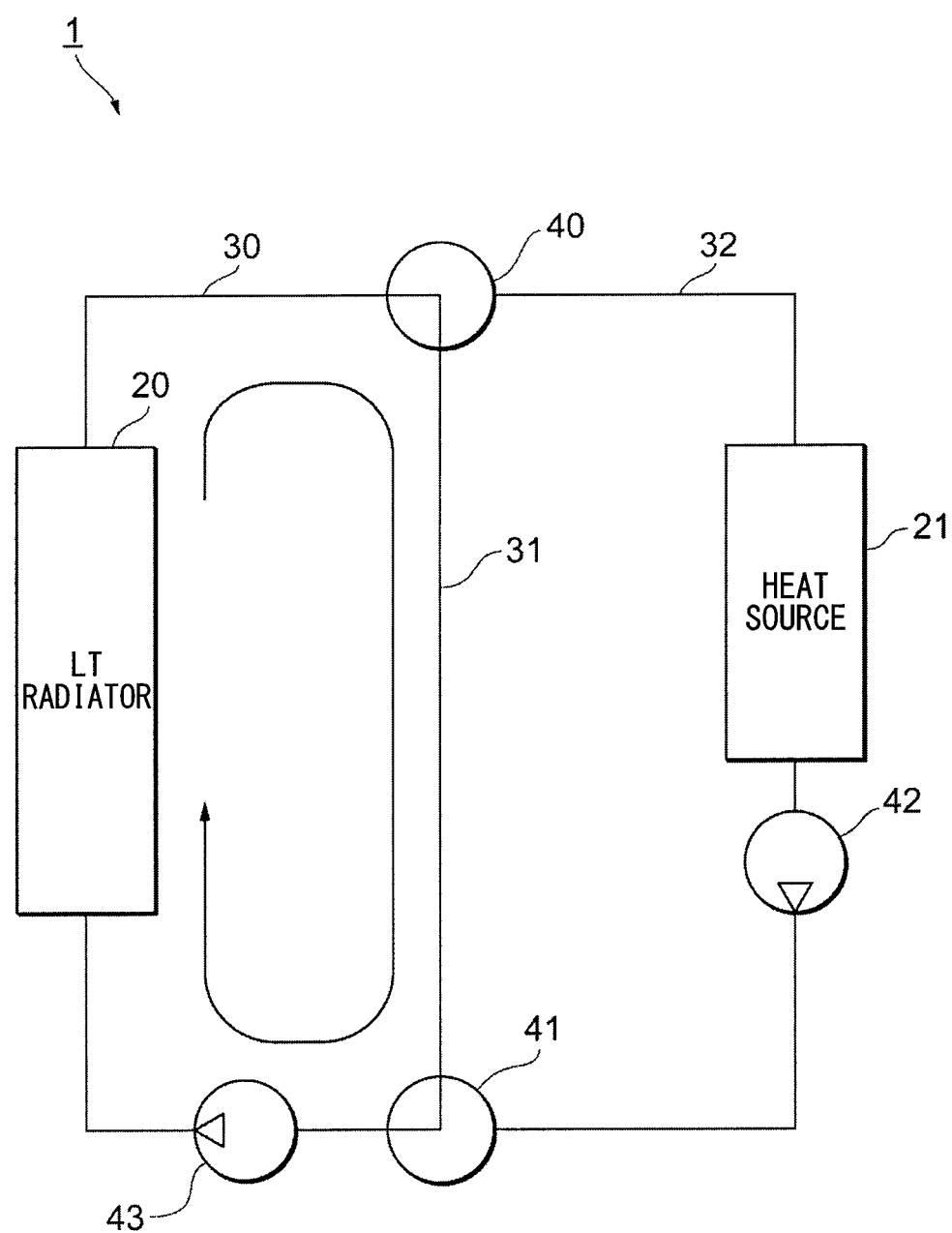
FIG. 9 is a diagram for explaining another flow of coolant in the heat pump system according to the embodiment of the present invention.
Figure 10:
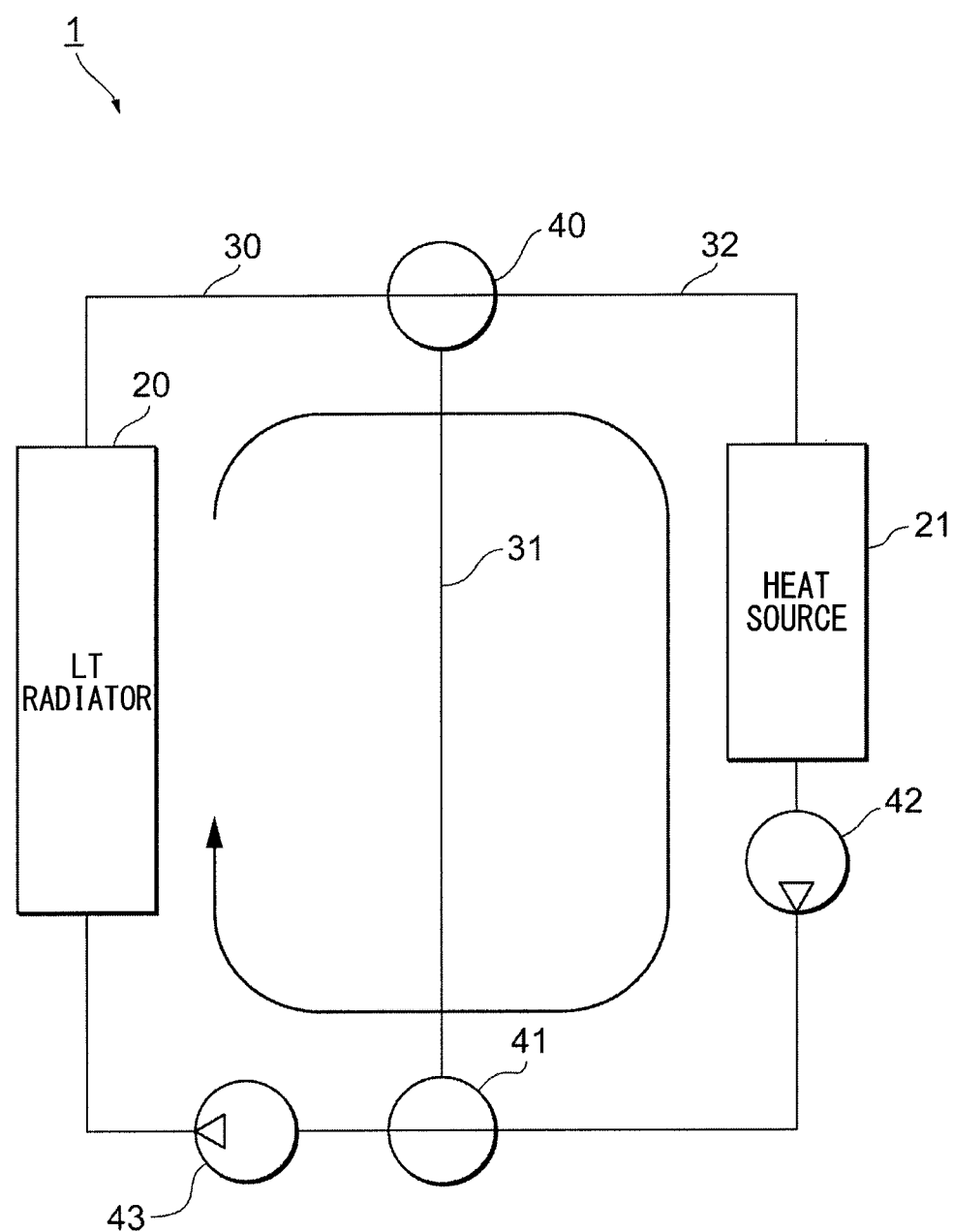
FIG. 10 is a diagram for explaining another flow of coolant in the heat pump system according to the embodiment of the present invention.
Figure 11:
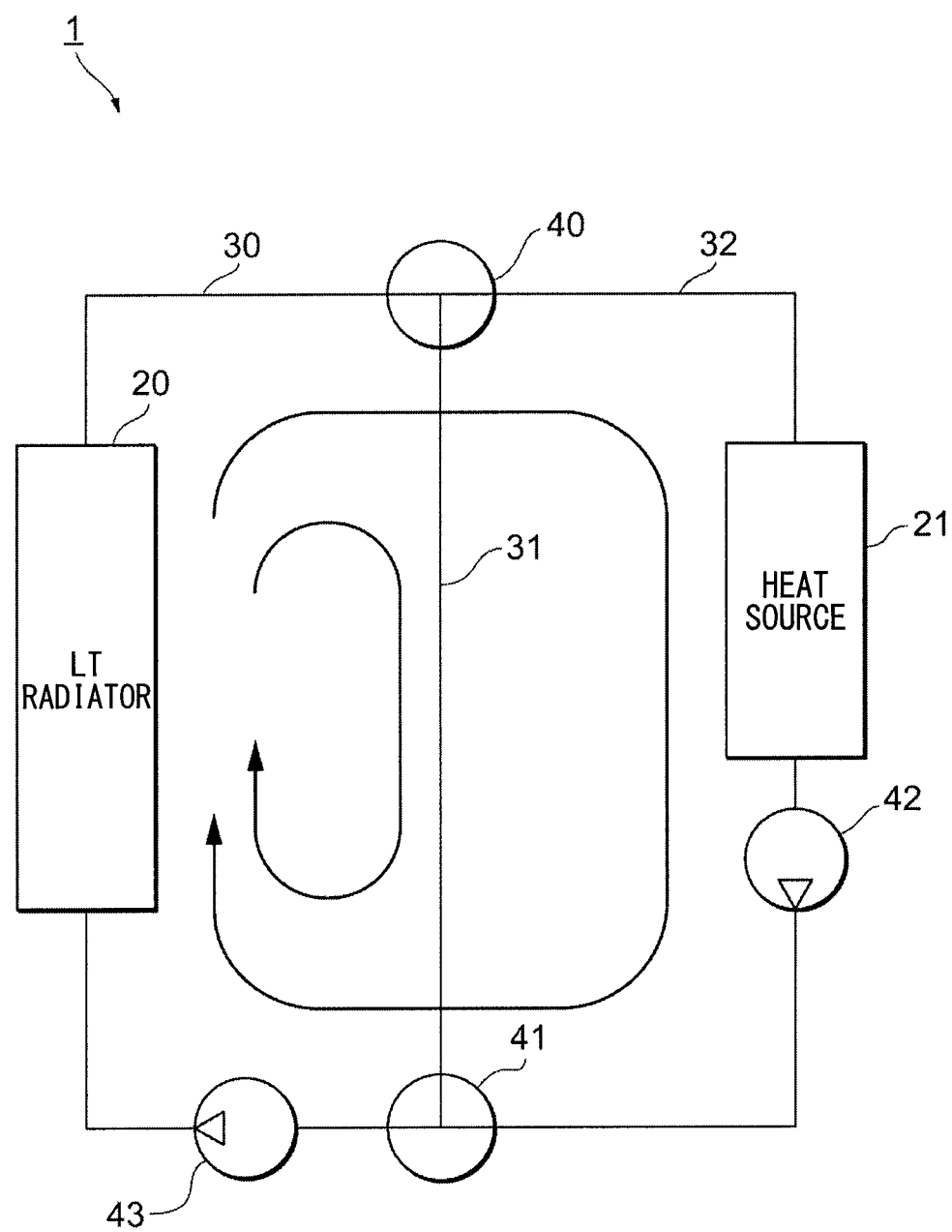
FIG. 11 is a diagram for explaining another flow of coolant in the heat pump system according to the embodiment of the present invention.

In step S207, the pump driving portion 103 stops driving the water pump 42. In step S208 following step S207, the flow-path switching portion 102 connects the coolant flow path 30 to at least one of the bypass flow path 31 and the heat source flow path 32. In step S209 following step S208, the pump driving portion 103 drives the water pumps 42 and 43. Referring to FIGS. 9 to 11, a further description will be given.

As shown in FIG. 9, the flow-path switching portion 102 connects the bypass flow path 31 to the coolant flow path 30 so that the pump driving portion 103 can drive the water pump 43. In this way, the defrosting of the LT radiator 20 can be carried out without significantly decreasing the coolant temperature in the heat source flow path 32. When the heat source 21 is the water-cooled condenser, the degradation in warming-up performance can be avoided when the heat pump system 1 operates immediately after the defrosting. When the heat source 21 is the engine, the heat pump system can be started immediately after the defrosting without letting the engine cool, thereby avoiding the reduction in the fuel efficiency.

As shown in FIG. 10, the flow-path switching portion 102 connects the heat source flow path 32 to the coolant flow path 30 so that the pump driving portion 103 can drive the water pumps 42 and 43. The heat amount of the coolant in the heat source flow path 32 is larger than the heat amount of the coolant in the bypass flow path 31. Thus, the defrosting of the LT radiator 20 can be completed quickly.

As shown in FIG. 11, the flow-path switching portion 102 connects the bypass flow path 31 and the heat source flow path 32 to the coolant flow path 30 so that the pump driving portion 103 can drive the water pumps 42 and 43. Thus, since both the heat amount of the coolant in the bypass flow path 31 and the heat amount of the coolant in the heat source flow path 32 can be available, the defrosting of the LT radiator 20 can be completed quickly.

Returning to FIG. 7, in step S210, the defrosting determination portion 104 determines whether or not the defrosting of the LT radiator 20 is completed. When the defrosting of the LT radiator 20 is determined not to be completed, the operation returns to the processing in step S202. When the defrosting of LT radiator 20 is determined to be completed, the operation proceeds to processing in step S211.

In step S211, the pump driving portion 103 stops driving the water pump 42 and the water pump 43.

Figure 12:
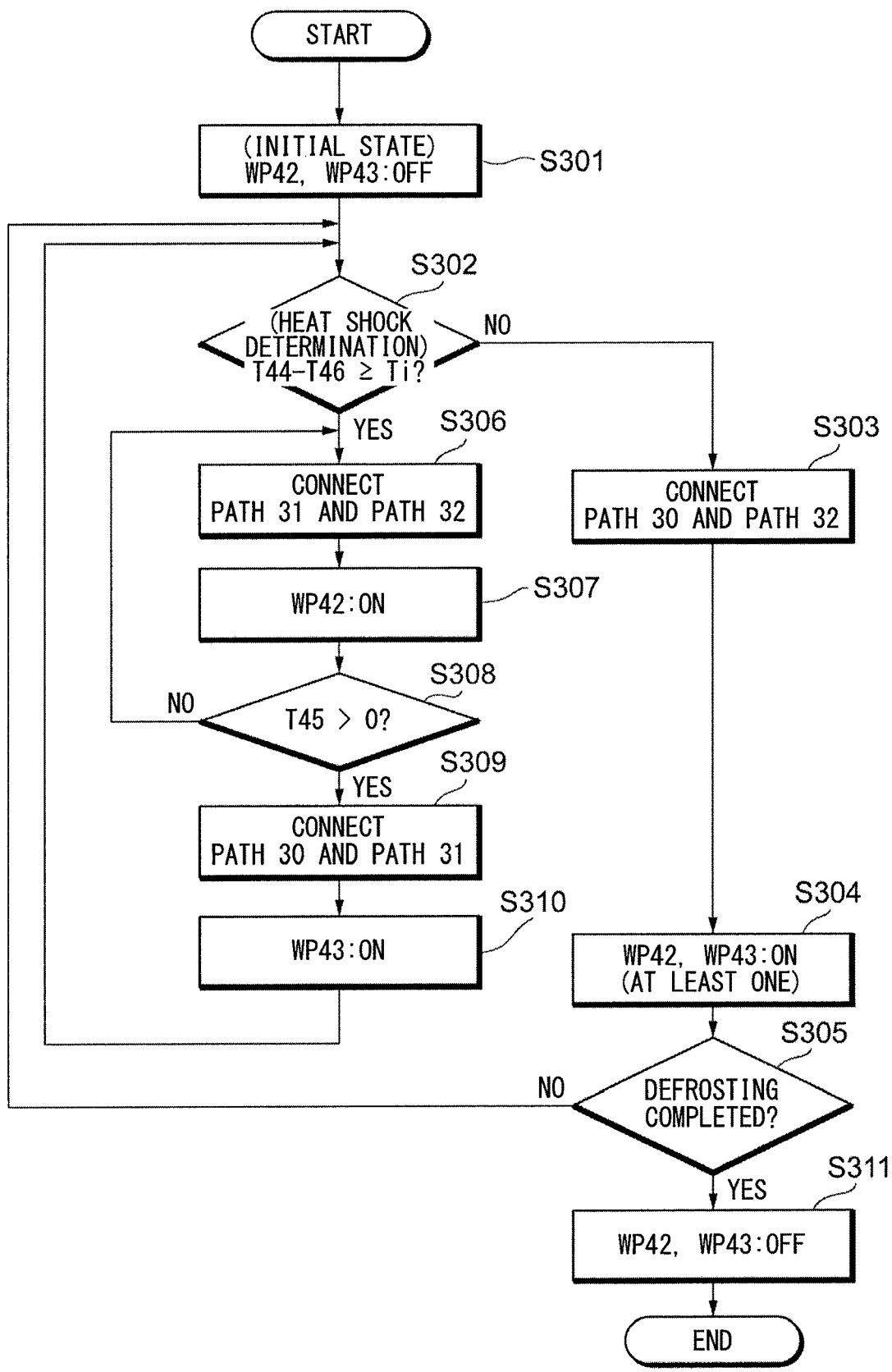
FIG. 12 is a flowchart for explaining another operation of the heat pump system according to the embodiment of the present invention.

Subsequently, referring to FIG. 12, another example of the operation of the controller 10 will be described. In step S301, a stop signal is output from the pump driving portion 103 to each of the water pumps 42 and 43, which become in a stopped state as an initial state.

In step S302 following step S301, the heat-shock determination portion 101 executes heat-shock determination. The heat-shock determination portion 101 determines whether or not a difference between the temperature T44 output from the water-temperature sensor 44 and the temperature T46 output from the water-temperature sensor 46 is equal to or more than a threshold value Ti. If a value obtained by subtracting the temperature T46 from the temperature T44, i.e., a value of temperature T44−temperature T46, is less than the threshold value Ti, heat shock could be determined not to occur, and the operation proceeds to processing in step S303. If a value of temperature T44−temperature T46 is equal to or more than the threshold value Ti, heat shock can be determined to occur, and the operation proceeds to processing in step S306.

In step S303, the flow-path switching portion 102 connects the coolant flow path 30 to the heat source flow path 32. In step S304 following step S303, the pump driving portion 103 drives at least one of the water pump 42 and the water pump 43.

In step S306, the flow-path switching portion 102 connects the bypass flow path 31 to the heat source flow path 32. In step S307 following step S306, the pump driving portion 103 drives the water pump 42. As shown in FIG. 8, the high-temperature coolant in the heat source flow path 32 is mixed with the intermediate-temperature coolant in the bypass flow path 31.

In step S308 following step S307, the heat-shock determination portion 101 determines whether or not the temperature T45 output by the water-temperature sensor 45 is equal to or higher than 0° C. When the temperature T45 is equal to or lower than 0° C., the operation returns to the processing in step S306. When the temperature T45 is higher than 0° C., the operation proceeds to processing in step S309.

In step S309, the flow-path switching portion 102 connects the coolant flow path 30 to the bypass flow path 31. In step S310 following step S309, the pump driving portion 103 drives the water pump 43. Following the processing in step S310, processing in step S302 is continued.

In step S305 following step S304, the defrosting determination portion 104 determines whether or not the defrosting of the LT radiator 20 is completed. When the defrosting of the LT radiator 20 is determined not to be completed, the operation returns to the processing in step S302. When the defrosting of LT radiator 20 is determined to be completed, the operation proceeds to processing in step S311.

In step S311, the pump driving portion 103 stops driving the water pump 42 and the water pump 43.

In this way, the coolant in the bypass flow path 31 is first caused to flow into the coolant flow path 30, thereby decreasing a difference between the coolant temperature in the coolant flow path 30 and the coolant temperature in the heat source flow path 32. Then, the coolant in the heat source flow path 32 is caused to flow into the coolant flow path 30. Thus, the defrosting of the LT radiator 20 can be completed more quickly while preventing the heat shock.

Figure 13:
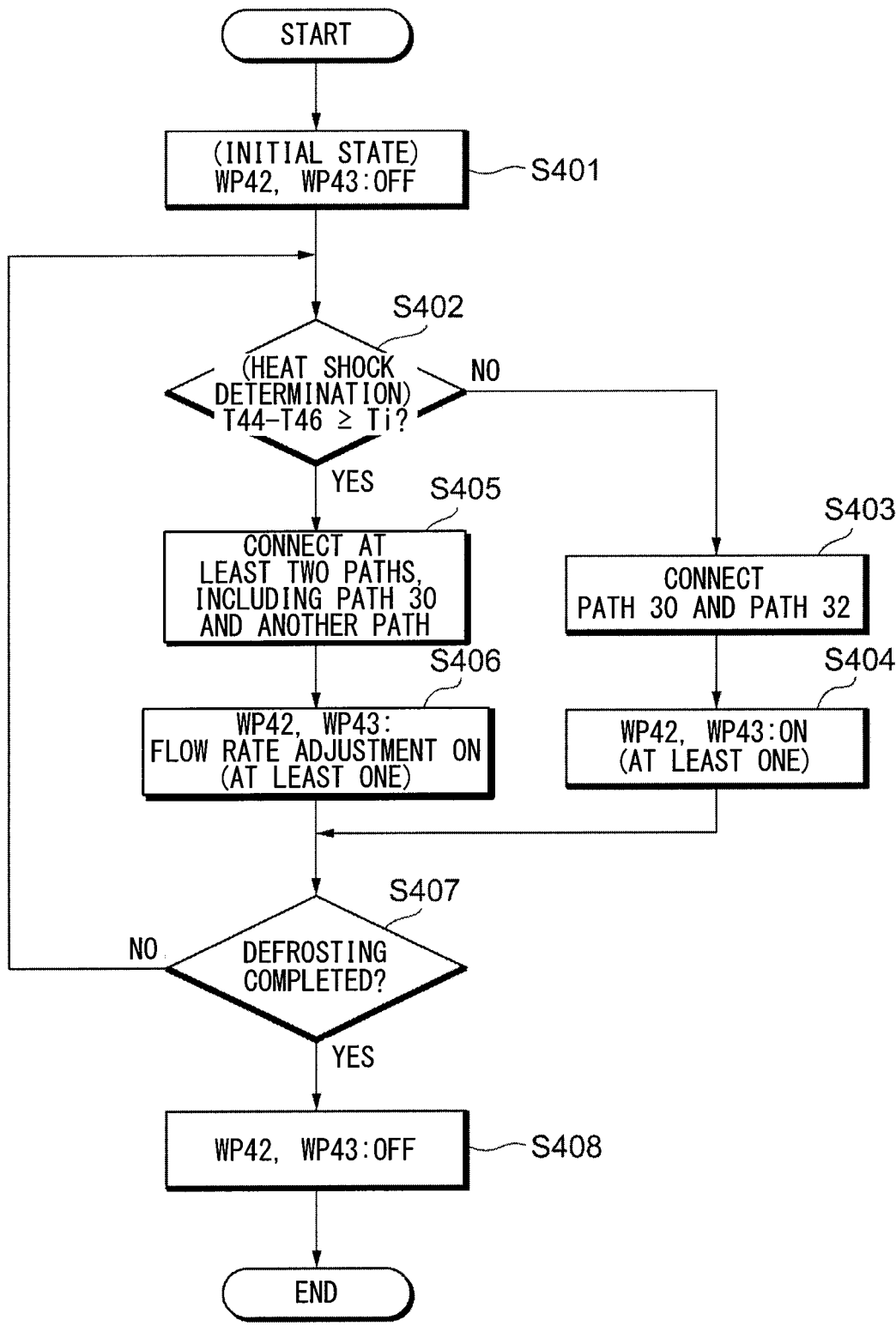
FIG. 13 is a flowchart for explaining another operation of the heat pump system according to the embodiment of the present invention.

Subsequently, another example of the operation of the controller 10 will be described with reference to FIG. 13. In step S401, a stop signal is output from the pump driving portion 103 to each of the water pumps 42 and 43, which become in a stopped state as an initial state.

In step S402 following step S401, the heat-shock determination portion 101 executes heat-shock determination. The heat-shock determination portion 101 determines whether or not a difference between the temperature T44 output from the water-temperature sensor 44 and the temperature T46 output from the water-temperature sensor 46 is equal to or more than a threshold value Ti. If a value obtained by subtracting the temperature T46 from the temperature T44, i.e., a value of temperature T44−temperature T46, is less than the threshold value Ti, heat shock could be determined not to occur, and the operation proceeds to processing in step S403. If a value of temperature T44−temperature T46 is equal to or more than the threshold value Ti, heat shock can be determined to occur, and the operation proceeds to processing in step S405.

In step S403, the flow-path switching portion 102 connects the coolant flow path 30 to the heat source flow path 32. In step S404 following step S403, the pump driving portion 103 drives at least one of the water pump 42 and the water pump 43. As shown in FIG. 4, the coolant circulates through the coolant flow path 30 and the heat source flow path 32, thereby defrosting the LT radiator 20.

In step S405, the flow-path switching portion 102 connects the coolant flow path 30 to at least two other flow paths. In the present embodiment, the flow paths, other than the coolant flow path 30, are two paths, namely, the heat source flow path 32 and the bypass flow path 31. Because of this, the heat source flow path 32 and the bypass flow path 31 are connected to the coolant flow path 30.

Figure 14:
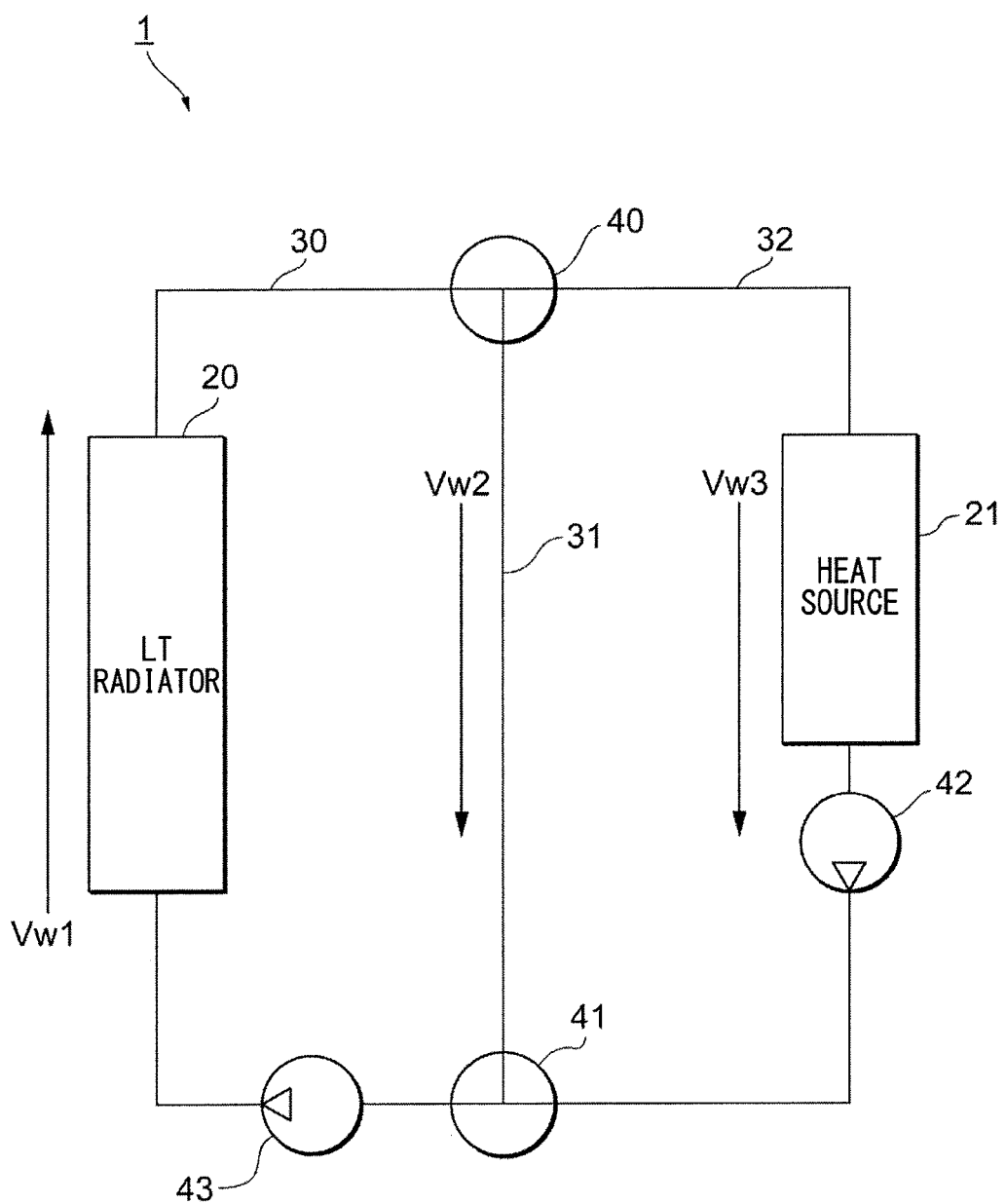
FIG. 14 is a diagram for explaining another flow of coolant in the heat pump system according to the embodiment of the present invention.

In step S406 following step S405, the pump driving portion 103 drives at least one of the water pump 42 and the water pump 43 while adjusting its flow rate. As shown in FIG. 14, the water pump 42 and the water pump 43 are driven such that the flow rate of the coolant in the bypass flow path 31 becomes Vw2, and the flow rate of the coolant in the heat source flow path 32 becomes Vw3. The flow rate Vw1 of the coolant in the coolant flow path 30 becomes Vw2+Vw3. For example, when T46 is −20° C., T45 is in a range of 0° C. to 10° C., and T44 is 60° C., heat shock could be more likely to occur if the coolant in the heat source flow path 32 is introduced into the LT radiator 20. For this reason, the coolant in the heat source flow path 32 cannot be introduced into the LT radiator. Then, when attempting to introduce the coolant in the bypass flow path 31, because T45 ranges from about 0 to 10° C., the heart amount for defrosting is deficient. Because of this, the flow rate of coolant is adjusted by regulating the valve opening degrees, so that the coolant in the bypass flow path 31 is introduced into the LT radiator 20 while being mixed with the coolant in the heat source flow path 32. Consequently, the coolant at a temperature of 0° C. or higher that prevents heat shock can be introduced into the LT radiator 20. As the temperature of the coolant introduced into the LT radiator 20 increases, the flow rate of the coolant introduced from the heat source flow path 32 is increased to enhance the heat amount introduced into the LT radiator 20, thereby enabling the defrosting at an early stage.

In step S407 following steps S404 and S406, the defrosting determination portion 104 determines whether or not the defrosting of the LT radiator 20 is completed. When the defrosting of the LT radiator 20 is determined not to be completed, the operation returns to the processing in step S402. When the defrosting of LT radiator 20 is determined to be completed, the operation proceeds to processing in step S408.

In step S408, the pump driving portion 103 stops driving the water pump 42 and the water pump 43.

Figure 15:
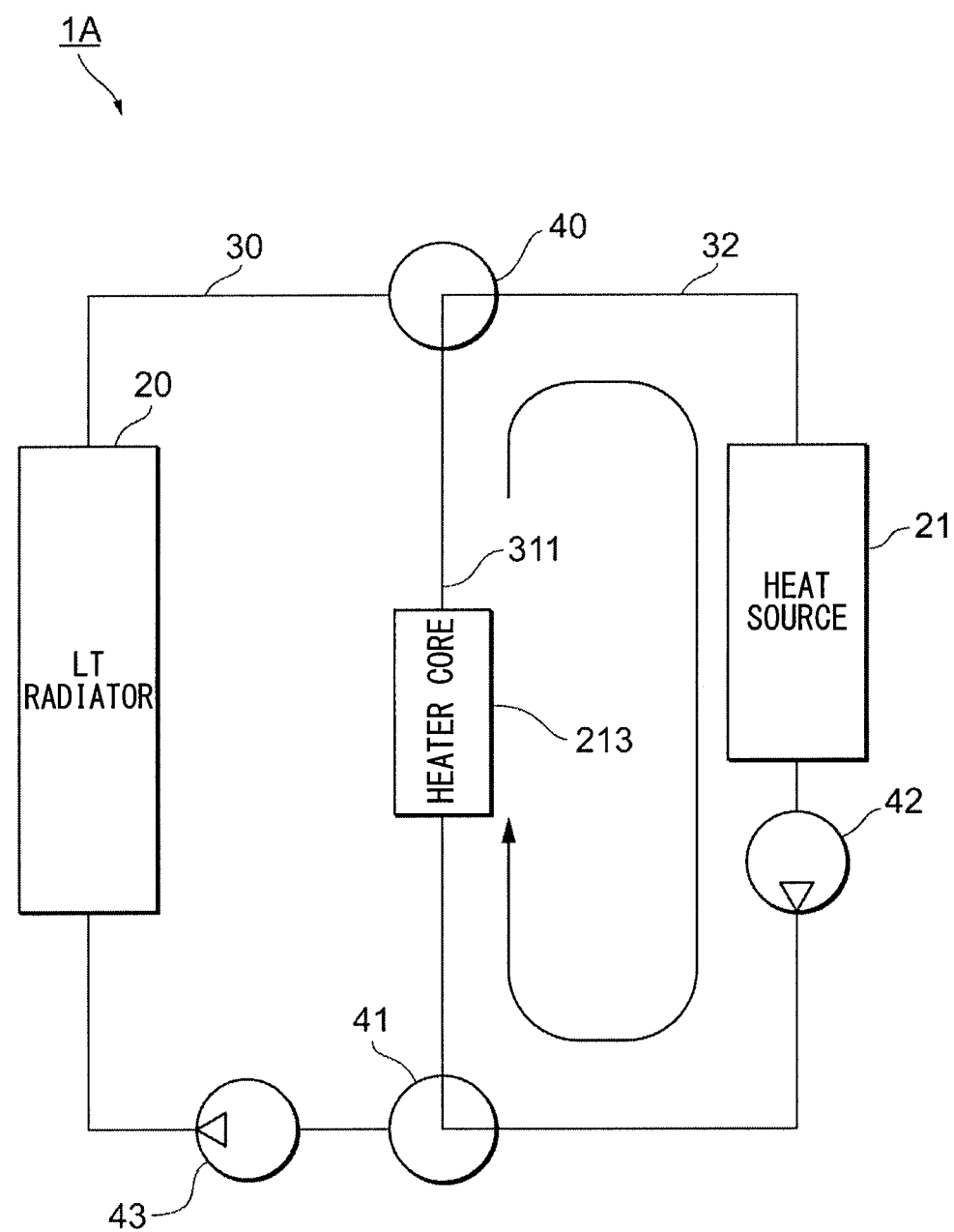
FIG. 15 is a diagram for explaining another flow of coolant in the heat pump system according to the embodiment of the present invention.

The above-mentioned description has explained the example in which nothing is provided in the bypass flow path 31. As shown in FIG. 15, a heat pump system 1A may be used in which the heater core 213 is provided in the bypass flow path 311.

Figure 16:
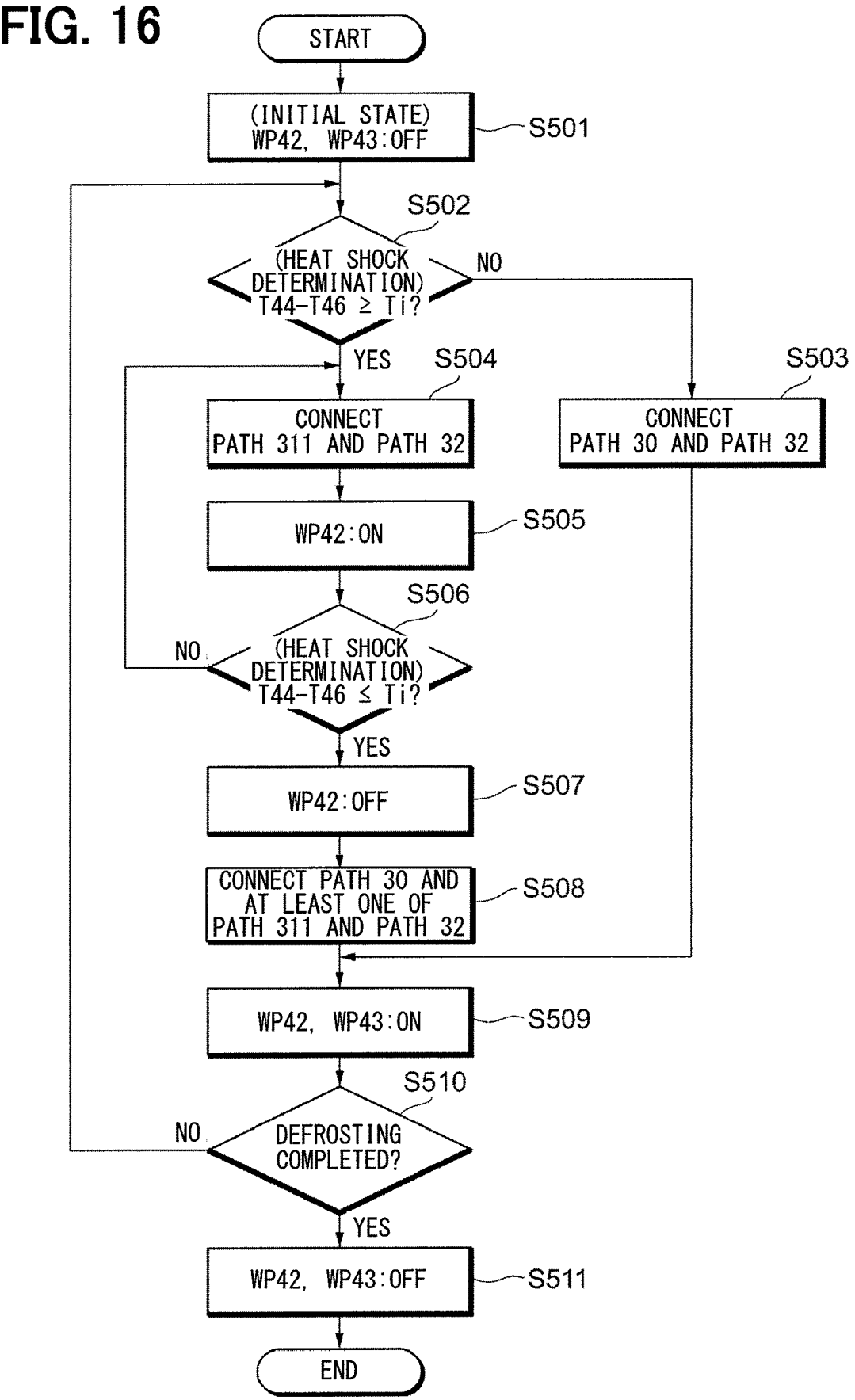
FIG. 16 is a flowchart for explaining another operation of the heat pump system according to the embodiment of the present invention.

Subsequently, referring to FIG. 16, the operation of the controller 10 in the heat pump system 1A will be described. In step S501, stop signals are output from the pump driving portion 103 to the water pumps 42 and 43, which become in a stopped state as an initial state.

In step S502 following step S501, the heat-shock determination portion 101 executes heat-shock determination. The heat-shock determination portion 101 determines whether or not a difference between the temperature T44 output from the water-temperature sensor 44 and the temperature T46 output from the water-temperature sensor 46 is equal to or more than a threshold value Ti. If a value obtained by subtracting the temperature T46 from the temperature T44, i.e., a value of temperature T44−temperature T46, is less than the threshold value Ti, heat shock could be determined not to occur, and the operation proceeds to processing in step S503. If a value of temperature T44−temperature T46 is equal to or more than the threshold value Ti, heat shock can be determined to occur, and the operation proceeds to processing in step S504. In step S503, the flow-path switching portion 102 connects the coolant flow path 30 to the heat source flow path 32.

In step S504, the flow-path switching portion 102 connects the bypass flow path 311 to the heat source flow path 32. In step S505 following step S504, the pump driving portion 103 drives the water pump 42. The high-temperature coolant in the heat source flow path 32 is mixed with the intermediate-temperature coolant in the bypass flow path 311. Since the heater core 213 is provided in the bypass flow path 311, the high-temperature coolant flowing through the bypass flow path 311 has its temperature adjusted such that its temperature is decreased in the heater core 213.

In step S506 following step S505, the heat-shock determination portion 101 executes heat-shock determination. The heat-shock determination portion 101 determines whether or not a difference between the temperature T44 output from the water-temperature sensor 44 and the temperature T46 output from the water-temperature sensor 46 is equal to or more than the threshold value Ti. If a value of temperature T44−temperature T46 is equal to or less than the threshold value Ti, heat shock could be determined not to occur, and the operation proceeds to processing in step S507. If a value of temperature T44−temperature T46 is more than the threshold value Ti, heat shock can be determined to occur, and then the operation returns to processing in step S504.

In step S507, the pump driving portion 103 stops driving the water pump 42. In step S508 following step S507, the flow-path switching portion 102 connects the coolant flow path 30 to at least one of the bypass flow path 311 and the heat source flow path 32. In step S509 following step S508, the pump driving portion 103 drives the water pumps 42 and 43.

In step S510, the defrosting determination portion 104 determines whether or not the defrosting of the LT radiator 20 is completed. When the defrosting of the LT radiator 20 is determined not to be completed, the operation returns to the processing in step S502. When the defrosting of LT radiator 20 is determined to be completed, the operation proceeds to processing in step S511.

In step S511, the pump driving portion 103 stops driving the water pump 42 and the water pump 43.

In the present embodiment as mentioned above, when the heat-shock determination portion 101 determines that a difference between the coolant temperature in the coolant flow path 30 and the coolant temperature in the heat source flow path 32 is equal to or higher than a predetermined temperature, the flow-path switching portion 102 mixes the respective coolants flowing through at least the bypass flow path 31 and the heat source flow path 32 together to flow into the coolant flow path 30. If the difference from the coolant temperature in the heat source flow path 32 is equal to or higher than the predetermined temperature, inconvenience due to heat shock can occur. Thus, the high-temperature coolant flowing through the heat source flow path 32 is mixed with the intermediate-temperature coolant flowing through the bypass flow path 31 to be supplied into the coolant flow path 30. Consequently, the coolant at a temperature that prevents heat shock can be supplied.

As mentioned above with reference to FIGS. 7 and 8, the flow-path switching portion 102 executes preparatory switching such that the coolant flowing through the bypass flow path 31 and the coolant flowing through the heat source flow path 32 are mixed to make a temperature of the mixed coolant equal to or lower than the threshold temperature that prevents heat shock in the LT radiator 20 as the outside-air heat sink. Then, the flow-path switching portion 102 executes supply switching to supply the coolant having the temperature equal to or lower than threshold temperature to the coolant flow path 30. The coolant temperature is previously adjusted by using the bypass flow path 31 and the heat source flow path 32, which are other flow paths not including LT radiator 20. Thus, the coolant can be adjusted to a temperature that surely prevents the occurrence of heat shock.

As mentioned above with reference to FIGS. 7 and 8, the flow-path switching portion 102 executes supply switching to supply the coolant in the bypass flow path 31 to the coolant flow path after execution of the preparatory switching. The defrosting can be performed without significantly decreasing the temperature of the heat source flow path 32, thereby making it possible to assure the warming-up performance immediately after the defrosting and to avoid the decrease in the temperature of the engine.

As mentioned above with reference to FIGS. 7 and 10, the flow-path switching portion 102 can also execute the supply switching to supply the coolant in the heat source flow path 32 to the coolant flow path 30 after execution of the preparatory switching. The coolant in the heat source flow path 32, which has a large amount of heat, is used to enable the defrosting at an early stage.

As mentioned above with reference to FIGS. 7 and 11, the flow-path switching portion 102 can also execute the supply switching to supply the respective coolants in the bypass flow path 31 and in the heat source flow path 32 to the coolant flow path 30 after execution of the preparatory switching. The heat of the respective coolants in both the bypass flow path 31 and the heat source flow path 32 can be used to perform the defrosting more quickly.

As mentioned above with reference to FIG. 7, the flow-path switching portion 102 can also execute the supply switching to compare a temperature of the coolant in the bypass flow path 31 with a temperature of the coolant in the heat source flow path 32 and to first supply the coolant having the lower temperature to the coolant flow path 30 after execution of the preparatory switching. By first introducing the coolant with the lower temperature, a difference in the temperature from the other coolant with a higher temperature can be made small, and consequently the defrosting can be performed at an early stage.

In the present embodiment, the flow-path switching portion 102 can first supply the coolant with the lower temperature to the coolant flow path 30, and can also supply the coolant in at least the heat source flow path 32 to the coolant flow path 30 when the difference between the temperature of the coolant in the coolant flow path 30 and the temperature of the coolant in the bypass flow path 31 is equal to or lower than the predetermined temperature. By restricting the difference in temperature between the coolant in the coolant flow path 30 and the coolant in the bypass flow path 31 to the predetermined temperature or lower, heat shock can be more surely avoided.

As mentioned above with reference to FIGS. 13 and 14, the flow-path switching portion 102 can execute sequent supply switching to supply the coolant in the bypass flow path 31 and the coolant in the heat source flow path 32 to the coolant flow path 30 while mixing both coolants. Thus, defrosting can be performed without execution of the preparatory switching, thereby enabling the defrosting more quickly.

In the present embodiment, during execution of the sequent supply switching, the flow-path switching portion 102 can adjust the ratio of the amount of coolant supplied from the bypass flow path 31 to the amount of coolant supplied from the heat source flow path 32, depending on the temperature of the coolant in the coolant flow path 30. Further, by adjusting the supply ratio, the introduced heat amount can be gradually increased, thereby enabling the defrosting more quickly.

The present embodiment has been described above with reference to specific examples. However, the present disclosure is not limited to these specific examples. Modifications in design can be made to these specific examples by those skilled in the art as appropriate. Such modifications are included in the scope of the present disclosure as long as they have the features of the present disclosure. The respective elements included in the above-mentioned respective specific examples and their arrangements, conditions, shapes, and the like are not limited to those described as examples, and can be modified as appropriate. The combination of the respective elements included in the above-mentioned specific examples can be changed appropriately as long as there is no technical contradiction.

What is claimed is:

1. A heat pump system for absorbing heat from outside air using a coolant, the heat pump system comprising:
   a flow path provided to cause the coolant to pass through an outside-air heat sink, a first three-way switching valve, a heat source, and a second three-way switching valve; and
   a controller configured to control the first three-way switching valve and the second three-way switching valve to control a flow-path switching in the flow path, and to determine heat shock occurrence in the outside-air heat sink based on a coolant temperature of the coolant flowing through the flow path, wherein the flow path includes a coolant flow path that leads from the first three-way switching valve to the second three-way switching valve through the outside-air heat sink, a heat source flow path that leads from the second three-way switching valve to the first three-way switching valve through the heat source, and a bypass flow path that directly connects the first three-way switching valve to the second three-way switching valve, and the controller is configured to mix the coolants flowing through at least the bypass flow path and the heat source flow path, and to cause the mixed coolant to flow into the coolant flow path, in response to the controller determining that a difference between a coolant temperature in the coolant flow path and a coolant temperature in the heat source flow path is higher than a predetermined temperature.

2. The heat pump system according to claim 1, wherein the controller is configured to execute a preparatory switching such that the coolant flowing through the bypass flow path and the coolant flowing through the heat source flow path are mixed to make a temperature of a reduced temperature mixed coolant formed by mixing coolant flowing through bypass and heat source flow paths equal to or lower than a threshold temperature that prevents heat shock in the outside-air heat sink, and the controller is configured to then execute a supply switching to supply the coolant having the temperature equal to or lower than the threshold temperature to the coolant flow path.

3. The heat pump system according to claim 2, wherein the controller is configured to execute the supply switching to supply the coolant in the bypass flow path to the coolant flow path after execution of the preparatory switching.

4. The heat pump system according to claim 2, wherein the controller is configured to execute the supply switching to supply the coolant in the heat source flow path to the coolant flow path after execution of the preparatory switching.

5. The heat pump system according to claim 2, wherein the controller is configured to execute the supply switching to supply the coolant in the bypass flow path and the coolant in the heat source flow path to the coolant flow path after execution of the preparatory switching.

6. The heat pump system according to claim 5, wherein the controller is configured to execute the supply switching by comparing a temperature of the coolant in the bypass flow path with the temperature of the coolant in the heat source flow path, and supply the coolant having a lower temperature to the coolant flow path after execution of the preparatory switching.

7. The heat pump system according to claim 6, wherein the controller is configured to supply the coolant having the lower temperature to the coolant flow path and supply at least the coolant in the heat source flow path to the coolant flow path, when a difference between the temperature of the coolant in the coolant flow path and the temperature of the coolant in the bypass flow path is equal to or lower than a predetermined temperature.

8. The heat pump system according to claim 1, wherein the controller is configured to execute a sequent supply switching to supply the coolant in the bypass flow path and the coolant in the heat source flow path to the coolant flow path while mixing both the coolants.

9. The heat pump system according to claim 8, wherein the controller is configured to adjust a ratio of an amount of the coolant supplied from the bypass flow path to an amount of the coolant supplied from the heat source flow path, depending on a temperature of the coolant in the coolant flow path during execution of the sequent supply switching.

10. The heat pump system according to claim 1, wherein a heater core is provided in the bypass flow path and is capable of decreasing the temperature of the coolant flowing through the bypass flow path and the heat source flow path.

* * * * *